United States Patent [19]
Ishimatsu et al.

[11] Patent Number: 6,071,677
[45] Date of Patent: Jun. 6, 2000

[54] MANUFACTURING METHOD OF LIQUID JET RECORDING HEAD USING A LASER WORKING METHOD

[75] Inventors: Shin Ishimatsu, Yokohama; Masaki Inaba, Kawasaki; Akio Saito, Machida; Akira Goto, Yokohama; Masao Furukawa, Yokohama; Toshinori Hasegawa, Yokohama; Miki Ito, Yokohama, all of Japan

[73] Assignee: Canon Kabushiki Kaisha, Tokyo, Japan

[21] Appl. No.: 09/041,746

[22] Filed: Mar. 13, 1998

[30] Foreign Application Priority Data

Mar. 14, 1997 [JP] Japan ..................................... 9-082190

[51] Int. Cl.⁷ .............................. B23K 26/00; B41J 2/16
[52] U.S. Cl. .......................... 430/320; 264/400; 430/945
[58] Field of Search ..................................... 430/269, 320, 430/322, 394, 396, 945; 264/400; 219/121.69

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata e al. | 346/1.1 |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |
| 5,305,018 | 4/1994 | Schwartz et al. | 347/47 |
| 5,694,684 | 12/1997 | Yamamoto | 29/890.1 |

FOREIGN PATENT DOCUMENTS

| | | |
|---|---|---|
| 0 495 670 | 7/1992 | European Pat. Off. . |
| 0 500 110 | 8/1992 | European Pat. Off. . |
| 0 709 199 | 5/1996 | European Pat. Off. . |
| 54-56847 | 5/1979 | Japan . |
| 59-123670 | 7/1984 | Japan . |
| 59-138461 | 8/1984 | Japan . |
| 60-71260 | 4/1985 | Japan . |
| 4-250048 | 9/1992 | Japan . |

*Primary Examiner*—John A. McPherson
*Attorney, Agent, or Firm*—Fitzpatrick, Cella, Harper & Scinto

[57] ABSTRACT

A laser working method which can easily and accurately work a fine and complicated shape by irradiation of a laser beam is provided. When a plurality of channel grooves are laser worked on a second board constituting a liquid jet recording head and projections are laser worked on the joint surface of groove walls between the channel grooves and the like, the projections are first worked and formed by irradiating the laser beam through a first mask pattern of a high space frequency arranged by transmitting portions to work the projections and light shielding portions. After that, the channel grooves are worked and formed by irradiating the laser beam through a second mask pattern of a low space frequency arranged by transmitting portions to work the channel grooves and light shielding portions. The formation of a secondary product due to the laser working can be reduced. Even when the laser working secondary product exists, the influence by the secondary product can be reduced and the working can be performed. A fine and complicated shape can be stably and cheaply worked.

4 Claims, 7 Drawing Sheets

MANUFACTURING METHOD OF LIQUID JET RECORDING HEAD USING A LASER WORKING METHOD

BACKGROUND OF THE INVENTION

1. Field of the Invention

The invention relates to a laser working method of working a complicated and fine shape by irradiating a laser beam to a work and a manufacturing method of a liquid jet recording head which can work a channel groove or the like using the laser working method, thereby enabling a fine recording to be performed.

2. Related Background Art

Figure 7A:
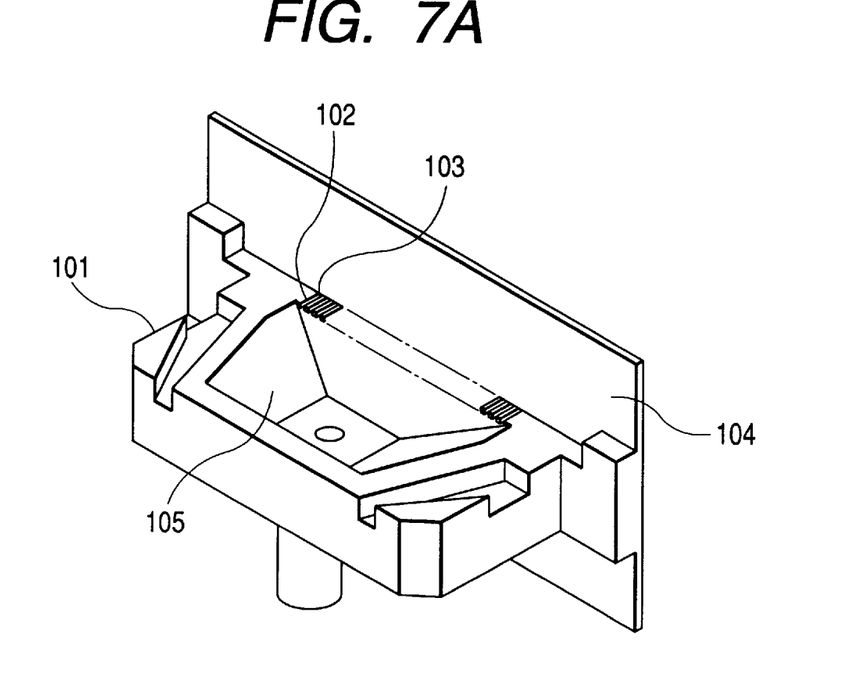
FIG. 7A is a perspective view of the second board constructing a liquid jet recording head.
Figure 7B:
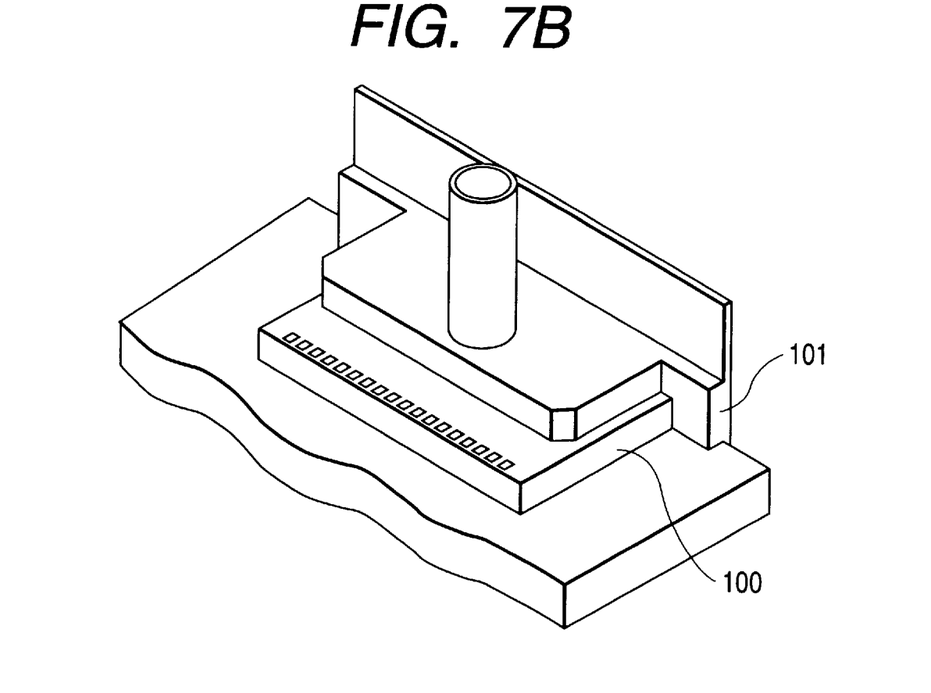
FIG. 7B is a perspective view of a liquid jet recording head assembled by joining a first board and a second board.

As shown in FIGS. 7A and 7B, a conventional liquid jet recording head comprises: a first board 100 in which a plurality of discharge energy generating elements (not shown) are formed at predetermined intervals; and a second board 101 having a plurality of discharge ports 103 formed in a discharge port plate 104, a plurality of channel grooves 102 which are respectively communicated with the discharge ports 103, and a common liquid chamber 105 for temporarily holding ink which is supplied to each channel groove 102. In a state where the discharge energy generating elements of the first board 100 and the channel grooves 102 of the second board 101 are positioned so as to accurately correspond to each other, the first board 100 and second board 101 are joined and combined with a pressure by a pressing spring or the like. In such a kind of liquid jet recording head, by applying a driving signal corresponding to recording information to the discharge energy generating element, a discharge energy is applied to the ink in the channel groove 102. Thus, the ink is discharged as a liquid droplet from the discharge port 103 communicated with the channel groove 102, thereby performing a print recording.

When the first board 100 and second board 101 are joined, there is a case where a gap occurs in the joint surface of both of the boards due to a stepped portion or a warp occurring in the first board 100, a variation in precision upon formation of the second board 101, or the like. In the liquid jet recording head in which both of the boards in such a state are built, when the ink is discharged from the relevant discharge port by applying a driving signal to a predetermined discharge energy generating element, the discharge energy is transferred to the adjacent channel groove through the gap and what is called a crosstalk phenomenon such that the ink is discharged from the adjacent discharge port, a predetermined amount of ink to be discharged changes, or the like occurs, so that there is a situation that a desired printing quality cannot be obtained.

It is, therefore, necessary to raise an adhesion property of both boards by more certainly and strictly joining the first and second boards so that a desired printing quality can be obtained by suppressing the occurrence of the crosstalk phenomenon. As a method of realizing such a high adhesion property, as disclosed in JP-A-4-250048 (EP-A-495670), there is known a method whereby projections which are deformed when joining to a first board are formed on a joint surface of a second board and, when the first and second boards are joined, the projections are crushed and deformed, thereby raising the adhesion property of both boards.

In the liquid jet recording apparatus, at present, high precision and high resolution are demanded and, in association with it, the realization of high density of discharge ports for discharging the ink in the second board and channel grooves, namely, the second board of a high density such that a nozzle density is equal to 600 dpi (dots per inch) is required. In the liquid jet recording head which can finely perform the print recording at a high resolution as mentioned above, it is necessary to arrange the discharge ports and channel grooves at a higher density and to also similarly arrange finer and at a higher density the projections which are used to raise the adhesion property when both boards are joined and are deformed at the time of the joint.

However, according to the method disclosed in JPA-4-250048 regarding the projections which are deformed when the second board is joined to the first board, it is effective to certainly join both boards. However, when the second board is molded by a resin by an injection molding or the like using a dye, the projections disclosed in the above Official Gazette are molded simultaneously with such a resin molding, so that there is a limitation in size of projection to be formed. According to the technique disclosed in the above Official Gazette, nothing is considered with respect to the realization of fineness and high density of the projections and it is extremely difficult to form the projections having fine and complicated shapes of a high density as mentioned above by the injection molding or the like. Therefore, a method whereby fine and complicated projections which are deformed when the first board is joined to the second board can be easily and cheaply formed at a fineness and a high density is demanded.

In order to form channel grooves and discharge ports of a high density in the second board, a laser working in which a working precision is high and the working operation can be performed in a short time is ordinarily used. A method whereby the second board of a shape in which none of the channel grooves and discharge ports is first formed is formed by a resin molding and a groove working and punching working are performed by irradiating a laser beam to the second board, and the projections as mentioned above are formed by the laser working together with the groove working of the channel grooves is excellent in working efficiency and costs. The development of such a working method is demanded.

SUMMARY OF THE INVENTION

The invention is, therefore, made in consideration of the unsolved problems in the above conventional technique and it is an object to provide a laser working method which can cheaply and accurately work fine pattern shapes of a fine and complicated space frequency by the irradiation of a laser beam. Another object of the invention is to provide a method of manufacturing a liquid jet recording head, in which projections having fine and complicated shapes are cheaply and accurately worked together with the working of channel grooves by using the laser working method and a fine liquid jet recording head can be manufactured.

To accomplish the above object, according to the invention, there is provided a laser working method of working a work by using a laser light source, a shaping optical system for shaping a laser beam that is emitted from the laser light source, an illumination optical system for illuminating a mask, a laser mask having a predetermined pattern corresponding to a working shape of the work, and a projection optical system for forming an image of a pattern of the laser mask at a predetermined magnification, wherein working shapes of the work are sequentially worked from the shape of a high space frequency of the mask pattern to the shape of a low space frequency.

According to the invention, there is also provided a laser working method of working a work by using a laser light source, a shaping optical system for shaping a laser beam that is emitted from the laser light source, an illumination optical system for illuminating a mask, a laser mask having a predetermined pattern corresponding to a working shape of the work, and a projection optical system for forming an image of a pattern of the laser mask at a predetermined magnification, wherein working shapes of the work are sequentially worked from the shape of a high space frequency of the mask pattern to the shape of a low space frequency under a condition in which a laser working secondary product exists.

According to the invention, there is provided a manufacturing method of a liquid jet recording head comprising: a first board in which a plurality of discharge energy generating elements for discharge ink are formed; and a second board in which a plurality of discharge ports for discharge the ink and a plurality of channel grooves communicating with the discharge ports are worked and formed, a common liquid chamber for temporarily holding the ink which is supplied to the channel grooves and the discharge ports is provided, and projections which are deformed when the first board and second boards are joined are further formed on a joint surface with the first board, whereby the liquid jet recording head is manufactured by joining the first and second boards in a form such that the discharge energy generating elements and the channel grooves correspond to each other, wherein when the channel grooves and the projections of the second board are laser worked by irradiating a laser beam through a laser mask having working patterns corresponding to those shapes, the working shapes are sequentially worked from the shape of a high space frequency of the mask pattern to the shape of a low space frequency.

Further, according to the invention, there is also provided a manufacturing method of a liquid jet recording head comprising: a first board in which a plurality of discharge energy generating elements for discharge ink are formed; and a second board in which a plurality of discharge ports for discharge the ink and a plurality of channel grooves communicating with the discharge ports are worked and formed, a common liquid chamber for temporarily holding the ink which is supplied to the channel grooves and the discharge ports is provided, and projections which are deformed when the first and second boards are joined are further formed on a joint surface with the first board, whereby the liquid jet recording head is manufactured by joining the first and second boards in a form such that the discharge energy generating elements and the channel grooves correspond to each other, wherein when the channel grooves and the projections of the second board are laser worked by irradiating a laser beam through a laser mask having working patterns corresponding to those shapes, the working shapes are sequentially worked from the shape of a high space frequency of the mask pattern to the shape of a low space frequency under a condition in which a laser working secondary product exists.

According to the manufacturing method of the liquid jet recording head of the invention, the mask pattern of the high space frequency is a pattern to work the projections which are deformed when joining, and the mask pattern of the low space frequency is a pattern to work the channel grooves.

According to the laser working method and the manufacturing method of the liquid jet recording head of the invention, the laser beam which is used for laser working is preferably a pulse ultraviolet laser beam.

When a fine and complicated shape is laser worked through the laser mask, in case of working by using a plurality of mask patterns, by sequentially laser working from the mask pattern of the high space frequency to the mask pattern of the low space frequency, the formation of a secondary product which is caused by the laser working can be reduced. Even when the secondary product due to the laser working exists, the shape can be worked while reducing an influence by the secondary product. Therefore, the fine and complicated shape can be stably and accurately worked. A fine and complicated shape or a pattern of a fine space frequency can be easily, cheaply, and accurately worked.

When a plurality of channel grooves are laser worked into the second board constituting the liquid jet recording head and the projections which are deformed when joining the second board are laser worked on the joint surface with the first board, the projections are first worked and formed by irradiating the laser beam through the first mask pattern of the high space frequency in which transmitting portions and light shielding portions for working the projections are formed. After that, the channel grooves are worked and formed by irradiating the laser beam through the second mask pattern of the low space frequency in which transmitting portions and light shielding portions for working the channel grooves are formed. Thus, a fine and complicated shape can be stably, accurately, and cheaply worked. The first and second boards can be joined with a good adhesion property. A finer liquid jet recording head can be easily and cheaply manufactured.

BRIEF DESCRIPTION OF THE DRAWINGS

FIGS. 2A and 2B are diagrams showing an outline of a laser working according to the embodiment of the invention, in which

FIGS. 3A and 3B are diagrams showing a comparative example to the laser working shown in FIGS. 2A and 2A, in which

FIGS. 5A and 5B are diagrams showing an outline of a laser working in accordance with another embodiment of the invention, in which

DETAILED DESCRIPTION OF THE PREFERRED EMBODIMENTS

An embodiment of the invention will now be described with reference to the drawings.

Figure 1:
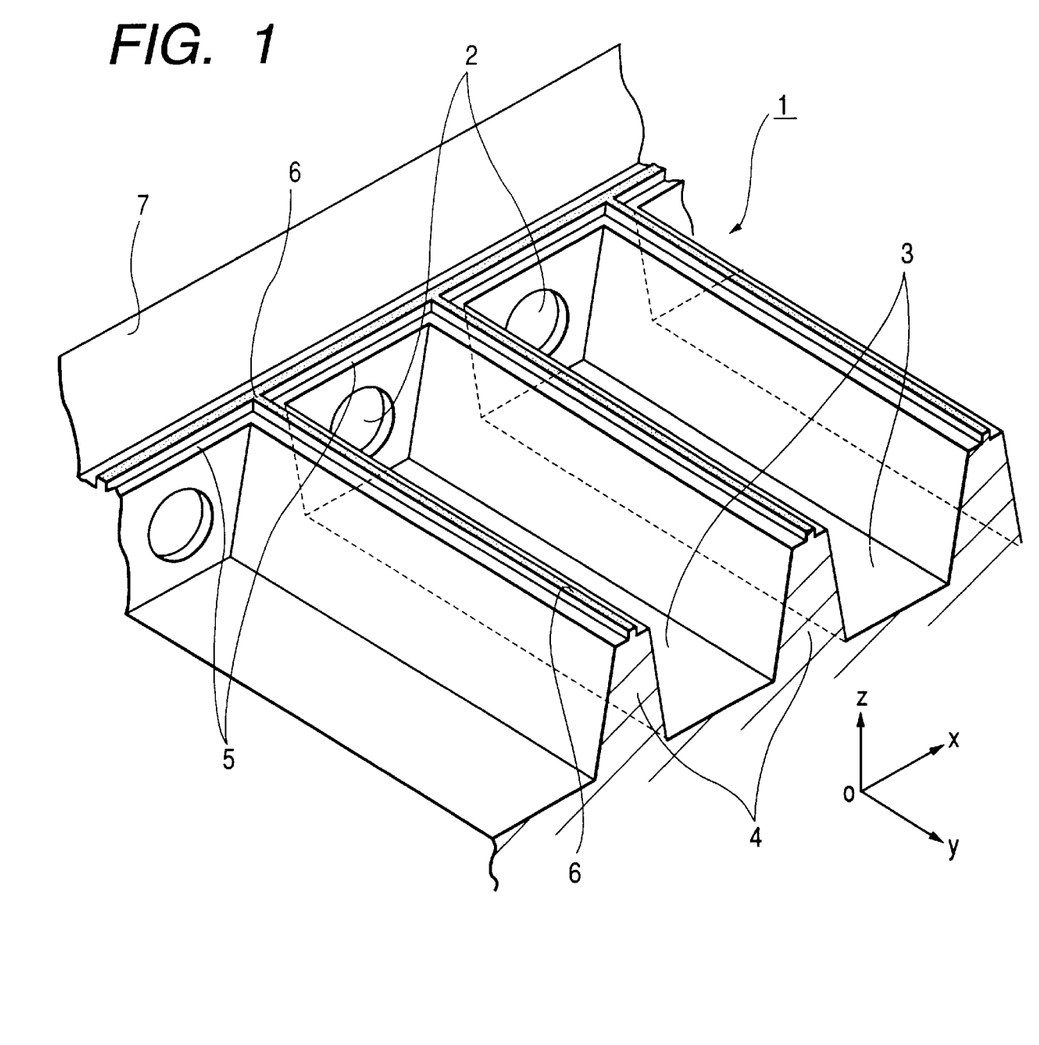
FIG. 1 is an enlarged perspective view showing shapes of channel grooves and projections while enlarging a part of a second board of a liquid jet head worked by an embodiment of the invention.

FIG. 1 is an enlarged perspective view showing enlargedly parts of channel grooves and projections in a second board of a liquid jet recording head in which the channel grooves and projections are worked and formed by a laser working method of the invention.

In the invention, as a material of a second board 1 constituting the liquid jet recording head, a resin of polysulfone, polyether sulfone, polyphenylene oxide, polypropylene, or the like in which a laser working can be easily performed and an excellent ink resistance is obtained is used. The second board 1 of a shape having none of the channel grooves, projections, and discharge ports, namely, a shape having a common liquid chamber, a discharge port plate, and a flat channel groove forming surface is resin-molded by an injection molding or the like. Channel grooves 3 and discharge ports 2 are respectively worked in a channel groove forming surface and a discharge port plate 7 of the resinmolded second board 1 by irradiating a laser beam. Projections 6 which are deformed when joining are also formed simultaneously with that the channel grooves 3 are worked by the laser beam.

In FIG. 1, the channel grooves 3 communicating with the discharge ports 2 formed in the discharge port plate 7 are formed in the second board 1, respectively. Projections 6 which are deformed when joining to a first board (not shown) and enhance an adhesion property of both boards are formed on the upper surfaces of groove walls 4 each of which is provided between the channel grooves in order to define the channel grooves 3 and on a joint surface 5 (jaw portion) of edge portions on the discharge port side of the channel grooves 3.

Figure 6:
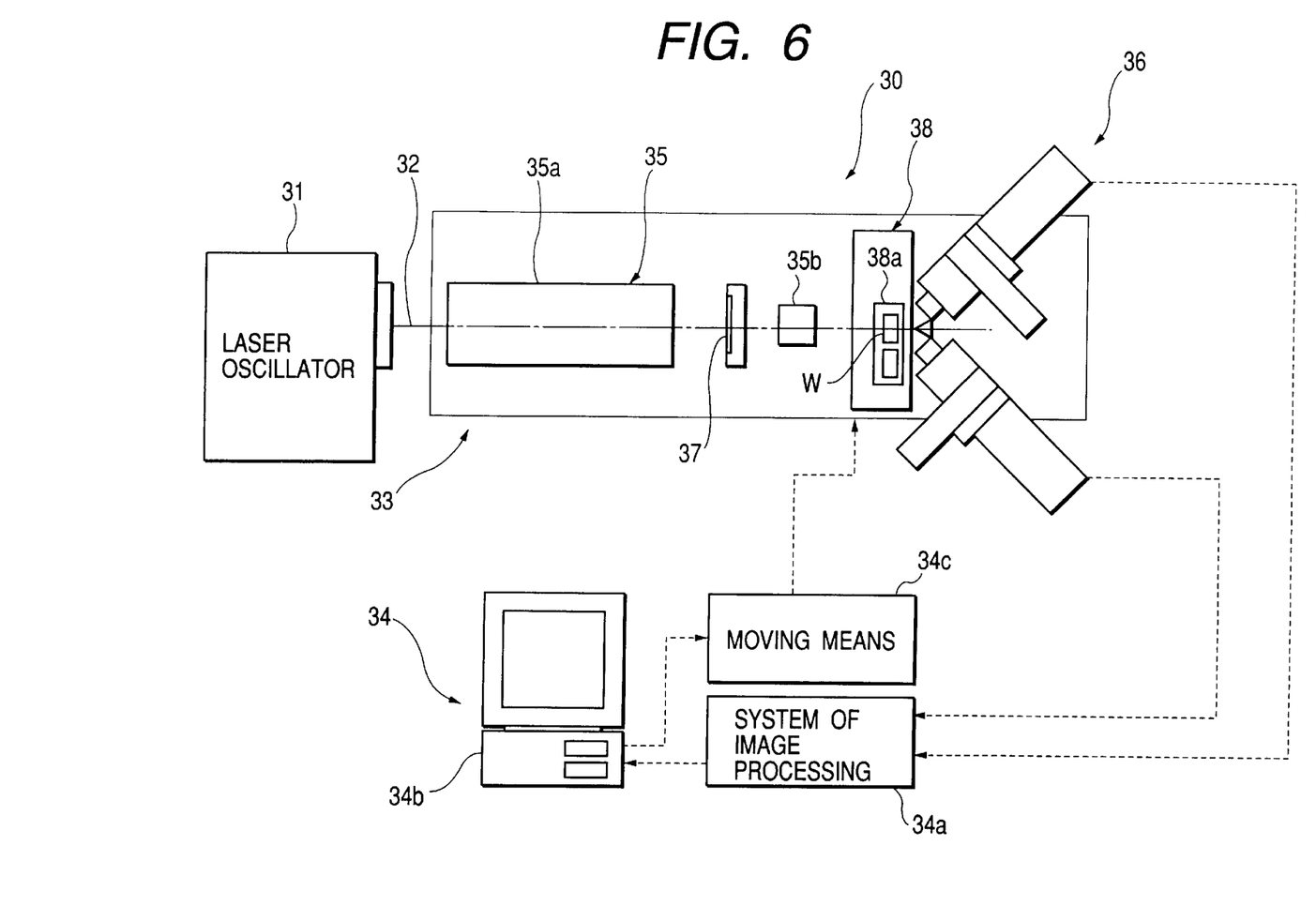
FIG. 6 is a constitutional diagram showing a schematic arrangement of a laser working machine.

A laser working machine which is applied to work the channel grooves 3 and projections 6 of the second board 1 shown in FIG. 1 will now be described with reference to FIG. 6 showing a schematic arrangement of the laser working machine.

In FIG. 6, a laser working machine 30 comprises: a laser oscillator 31 serving as a laser light source to emit a laser beam 32; an apparatus frame 33 equipped with a working system for working a second board as a workpiece W by the laser beam 32 from the laser oscillator 31; and a control unit 34 for performing an information process and a control regarding the working of the workpiece W. The apparatus frame 33 into which the laser beam 32 generated from the laser oscillator 31 enters comprises: an optical system 35; an observation measuring system 36 for observing and measuring the position of the workpiece W; a laser mask 37 on which a desired working pattern has been formed; and a workstation 38 for moving the workpiece W. The optical system 35 comprises: a shaping optical system which is arranged on an optical axis of the laser beam 32 and shapes the laser beam and an illumination optical system for illuminating the laser mask (hereinafter, those systems are generally referred to as a shaping and illumination optical system 35a); and a projection optical system 35b for forming an image of the working pattern of the laser mask 37 onto a working surface of the workpiece W at a predetermined magnification. The laser mask 37 is arranged between the shaping and illumination optical system 35a and projection optical system 35b. It is preferable to use a reduction optical system as a projection optical system 35b in consideration of durability of the laser mask 37. The observation measuring system 36 comprises an objective lens, a lens barrel, and an ITV camera for observing and measuring the position of the workpiece W set on the workstation 38 by using a jig 38a. Information from the observation measuring system 36 is processed by a system 34a of image processing and a control system 34b of the control unit 34. On the basis of a processing result, moving means 34c makes the workstation 38 operative.

Figure 2A:
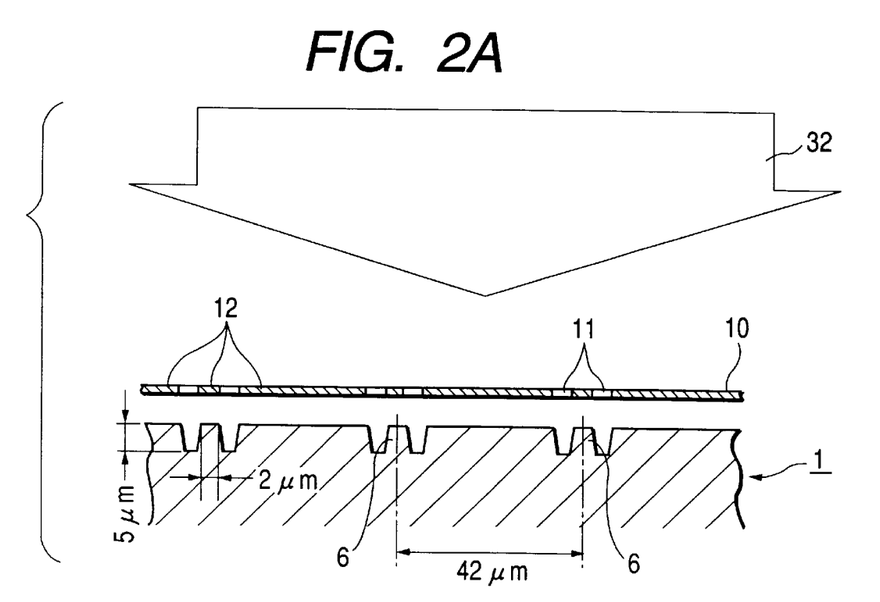
FIG. 2A shows a state of first working projections of the second board and FIG. 2B shows a state of subsequently working channel grooves.
Figure 2B:
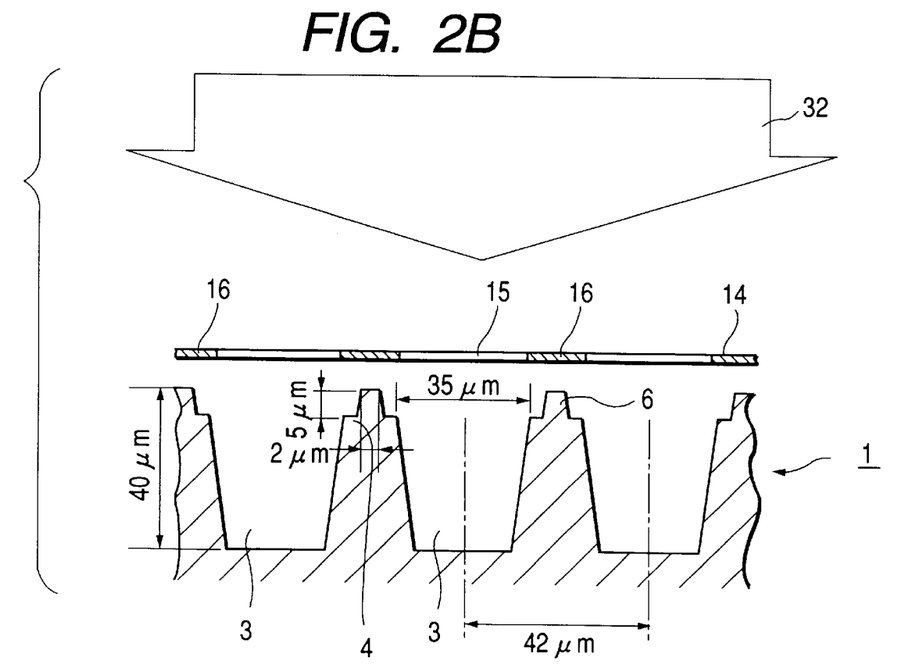

FIGS. 2A and 2B diagrams showing an outline of the laser working and most preferably illustrating an embodiment of a laser working method of the invention and are cross sectional views taken along an xz plane in FIG. 1. In the working of the channel grooves and projections of the second board based on the laser working method of the invention, two mask patterns 10 and 14 are prepared. As shown in FIG. 2A, the first mask pattern 10 which is used to work the projections 6 includes: transmitting portions 11 which transmit the laser beam 32 in order to form the projections 6 and light shielding portions 12 which do not transmit the laser beam 32. As shown in FIG. 2B, the second mask pattern 14 which is used to work the channel grooves 3 includes: transmitting portions 15 which transmit the laser beam 32 in order to form the channel grooves 3; and light shielding portions 16 which do not transmit the laser beam 32. It is possible to form the mask patterns 10 and 14 into one laser mask and to switch the mask patterns at the time of each working operation. Or, it is also possible to form the mask patterns 10 and 14 into different laser masks respectively and to perform the working by exchanging the laser masks at the time of each working operation. The transmitting portions 11, 15 and light shielding portions 12, 16 can be formed in the first and second mask patterns 10, 14 by providing portions where chromium is not vapor-deposited to synthetic quartz and portions where chromium is vapor-deposited. The portions where chromium is not vapor-deposited become the transmitting portions 11 and 15. Portions where chromium was vapor-deposited become the light shielding portions 12 and 16. As will be also obviously understood from FIGS. 2A and 2B, since the first mask pattern 10 to work the projections 6 becomes more complicated as a pattern, a space frequency is high. The second mask pattern 14 to work the channel grooves 3 does not have so complicated pattern shape and a space frequency is low.

As a laser oscillator 31 for generating the laser beam 32, an oscillator to generate a pulse ultraviolet laser beam is suitable. As a pulse ultraviolet laser, it is possible to use any one of quaternary harmonics like an Xe—Cl excimer laser, a Kr—F excimer laser, an Ar—F excimer laser, and a YAG laser, a mixing wave of a fundamental wave and the secondary harmonics of the YAG laser, a nitrogen gas laser, and the like.

An embodiment of the invention will now be described in detail with reference to FIGS. 2A and 2B. In the embodiment, polysulfone is used as a material of the second board 1 to work and form the channel grooves 3 and Kr—F excimer laser of 288 nm is used as a laser beam.

As shown in FIG. 2A, the laser beam 32 is first irradiated to the working surface of the resin-molded second board 1 through the first mask pattern 10 of a high space frequency. An energy density of the laser beam 32 at the working surface is set to 1 J/cm$^2$·puls and 10 pulses are irradiated, thereby forming 300 projections 6 each having a size of (2 $\mu$m×5 $\mu$m×450 $\mu$m) [(dimension in the x-axis direction)×(dimension in the z-axis direction)×(dimension in the y-axis direction) in FIG. 1] at a pitch of 42 $\mu$m. After that, 100 pulses of the laser beam at the same energy density of 1 J/cm$^2$·puls are irradiated through the second mask pattern 14 of a low space frequency, thereby forming 300 channel grooves 3 each having a size of (35 $\mu$m×40 $\mu$m×450 $\mu$m) [(dimension in the x-axis direction)×(dimension in the z-axis direction)×(dimension in the y-axis direction) in FIG. 1] at a pitch of 42 $\mu$m.

Thus, an arrangement having the projections 6 on the joint surface 5 including the upper portions of the groove walls 4 and having the channel grooves 3 can be formed. The printing operation was actually executed by a liquid jet recording head in which the second board 1 having the projections 6 worked and formed as mentioned above had been joined to the first board on which a plurality of discharge energy generating elements were formed as shown in FIGS. 7A and 7B and assembled. Consequently, a good and stable print could be obtained.

Figure 3A:
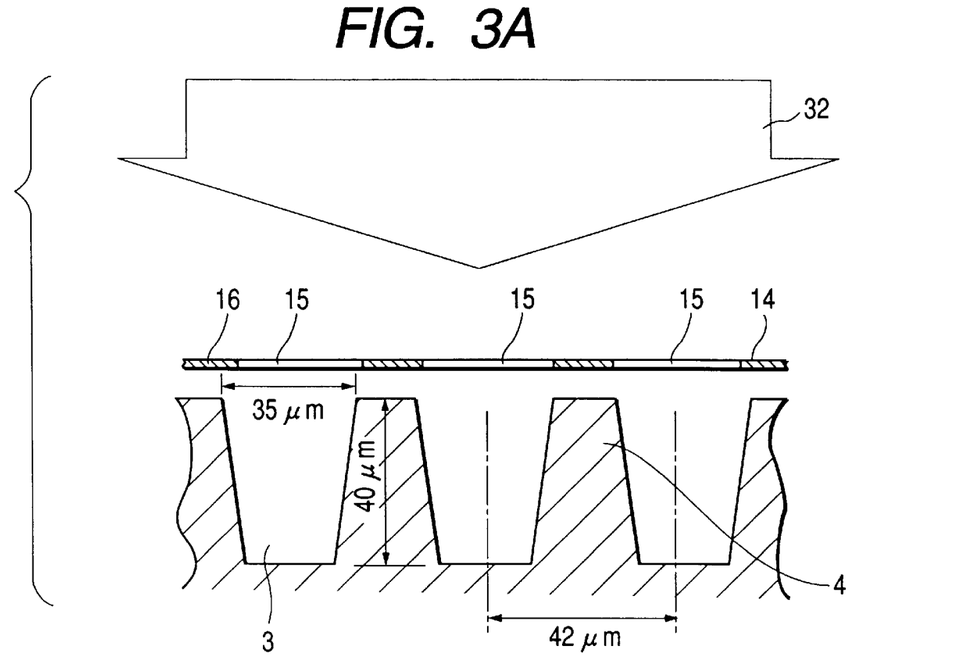
FIG. 3A shows a state of first working channel grooves of the second board and FIG. 3B shows a state of subsequently working projections.
Figure 3B:
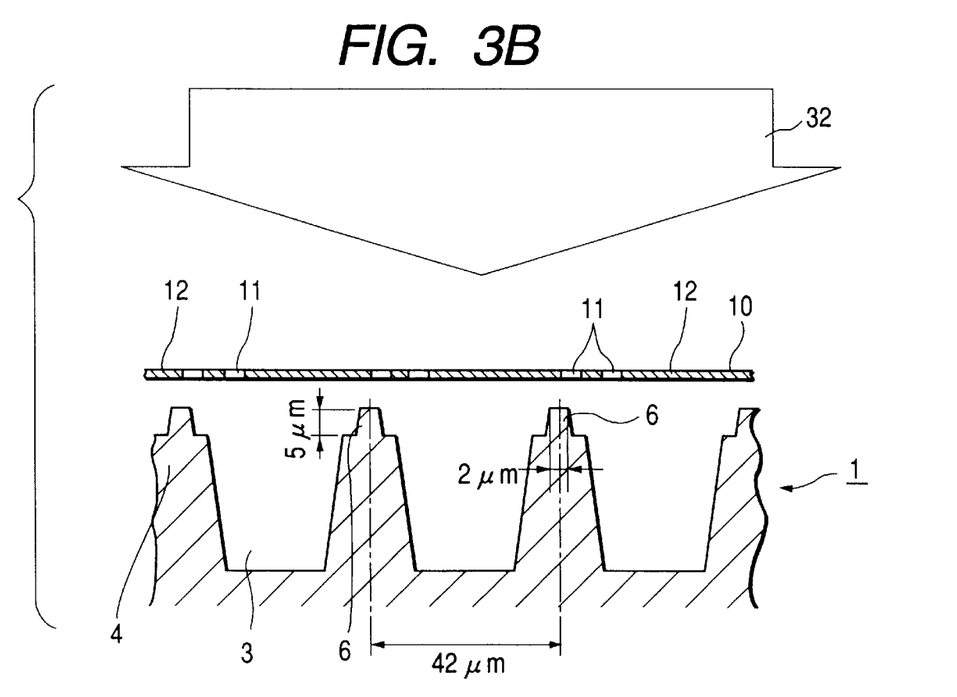

FIGS. 3A and 3B show comparative examples to the embodiment of the invention shown in FIGS. 2A and 2B and are schematic diagrams in case of sequentially working from a pattern of a low space frequency to a pattern of a high space frequency. The same material of polysulfone as that mentioned above is used as a material of the second board to work the channel grooves 3. Similarly, a Kr—F excimer laser of 288 nm is also used as a laser beam.

First, the excimer laser beam 32 is irradiated to the working surface of the second board through the second mask pattern 14 of a low space frequency. An energy density of the laser beam at the working surface is set to 1 J/cm$^2$·puls and 100 pulses are irradiated, thereby forming 300 channel grooves 3 each having a size of (35 $\mu$m×40 $\mu$m×450 $\mu$m) [(dimension in the x-axis direction)×(dimension in the z-axis direction)×(dimension in the y-axis direction) in FIG. 1] at a pitch of 42 $\mu$m. After that, at the energy density of 1 J/cm$^2$·puls, ten pulses of the laser beam are irradiated through the first mask pattern 10 of a high space frequency, thereby forming 300 projections 6 each having a size of (2 $\mu$m×5 $\mu$m×450 $\mu$m) [(dimension in the x-axis direction)× (dimension in the z-axis direction)×(dimension in the y-axis direction) in FIG. 1] at a pitch of 42 $\mu$m.

It was tried to form a structure having the projections 6 on the joint surface 5 including the upper portions of the groove walls 4. However, a second board in which a part of the projections 6 are not worked and a second board in which the shape is not accurate were formed. It is considered that this is because when the channel grooves are laser worked, a generated secondary product is adhered to the projection forming portion, so that a desired laser working cannot be performed. The printing operation was actually executed by a liquid jet recording head in which the second board 1 having the projections 6 worked and formed as mentioned above had been joined to the first board as shown in FIGS. 7A and 7B and assembled. Thus, the first and second boards were not certainly joined and a good print could not be obtained.

Another embodiment of the invention will now be described with reference to FIGS. 4, 5A and 5B.

Figure 4:
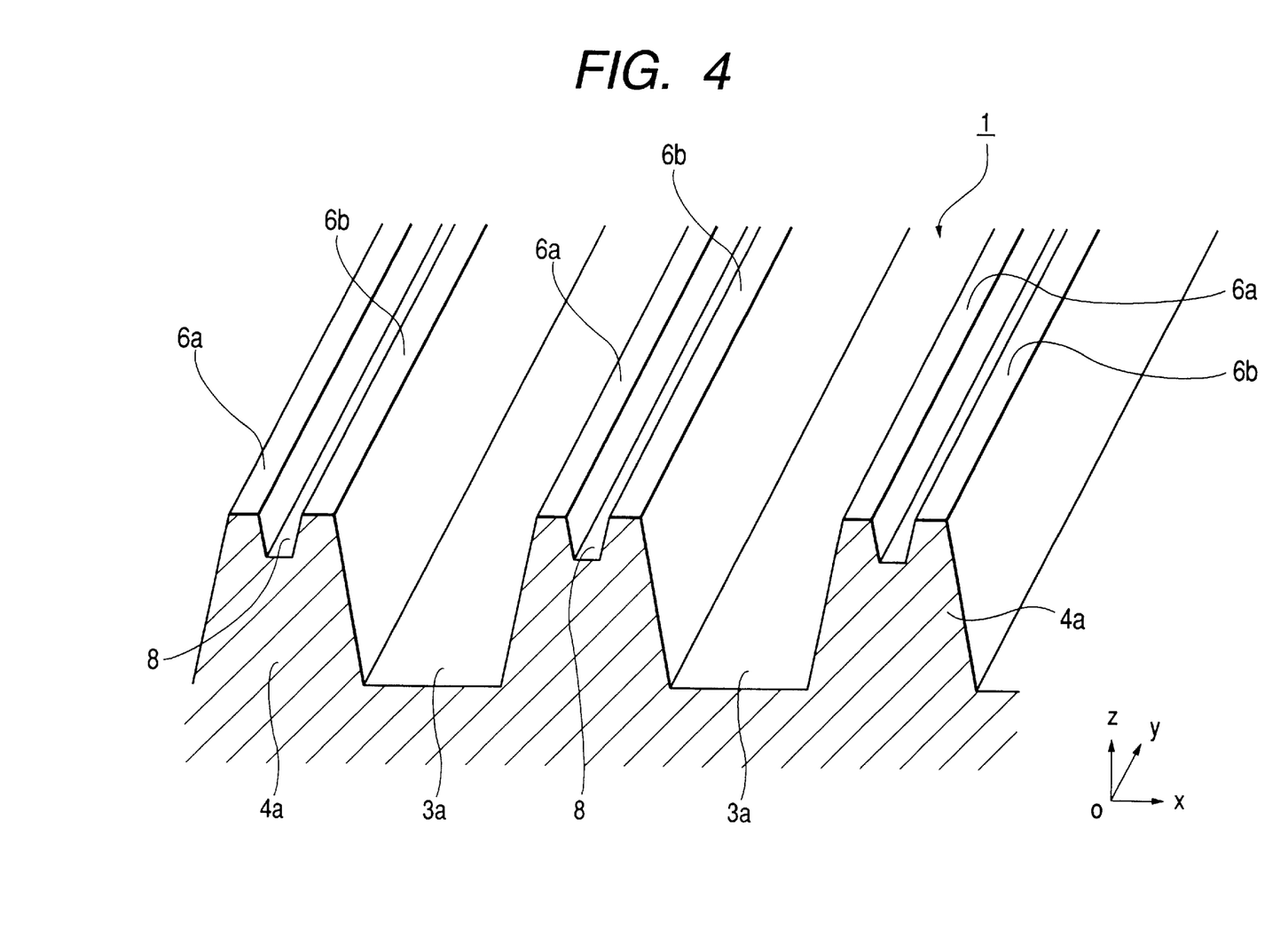
FIG. 4 is an enlarged perspective view showing shapes of channel grooves and projections while enlarging a part of a second board of a liquid jet head worked by another embodiment of the invention.

FIG. 4 is an enlarged perspective view showing enlargedly channel grooves and projections in a portion of the second board worked by another embodiment of a laser working method of the invention. Reference numeral 3a denotes channel grooves; 4a groove walls; and 6a and 6b projections formed on the upper surfaces of the groove walls 4a. Although not shown here, discharge ports communicating the channel grooves 3a are formed.

Figure 5A:
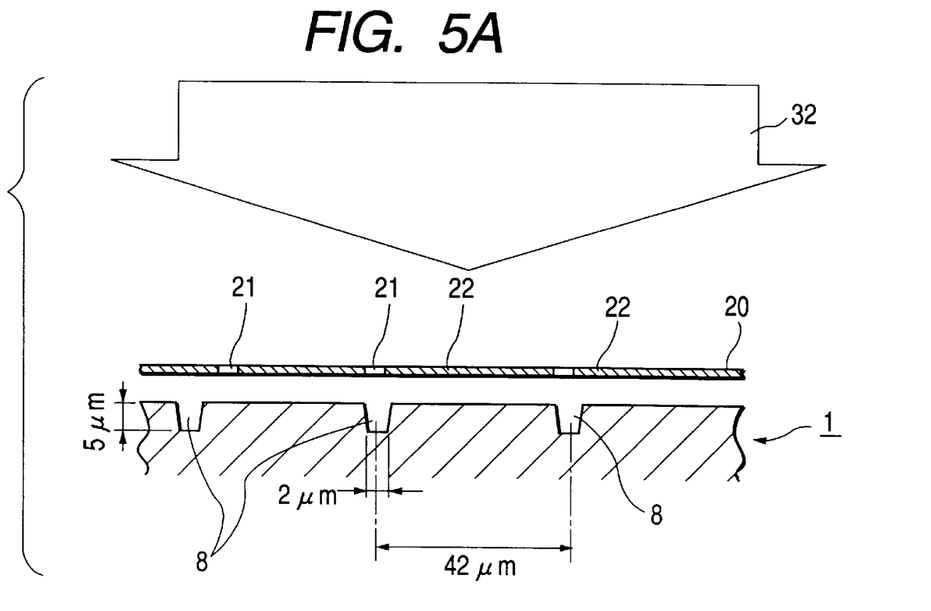
FIG. 5A shows a state of first working projections of the second board and FIG. 5B shows a state of subsequently working channel grooves.
Figure 5B:
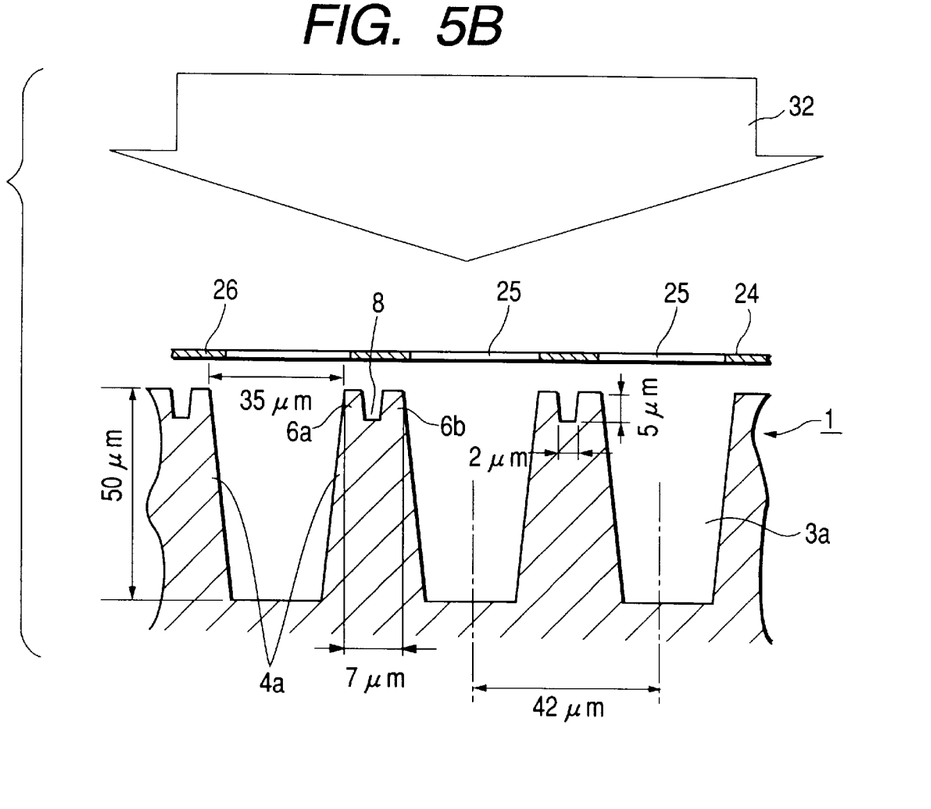

FIGS. 5A and 5B are diagrams showing an outline of a laser working according to another embodiment of the laser working method of the invention and are cross sectional views taken along the xz plane in FIG. 4. Reference numeral 20 denotes a first mask pattern of a high space frequency comprising transmitting portions 21 and light shielding portions 22 to work each concave portion 8 between the projections 6a and 6b. Reference numeral 24 denotes a second mask pattern of a low space frequency comprising transmitting portions 25 and light shielding portions 26 to work the channel grooves 3a. The laser working is executed in working conditions similar to those in the foregoing embodiment. First, 300 concave portions 8 each having a size of (2 $\mu$m×5 $\mu$m×450 $\mu$m) [(dimension in the x-axis direction)×(dimension in the z-axis direction)×(dimension in the y-axis direction) in FIG. 4] are formed at a pitch of 45 $\mu$m through the first mask pattern 20 of a high space frequency. After that, 300 channel grooves 3a each having a size of (35 $\mu$m×50 $\mu$m×450 $\mu$m) [(dimension in the x-axis direction)×(dimension in the z-axis direction)×(dimension in the y-axis direction) in FIG. 4] are formed at a pitch of 45 $\mu$m through the second mask pattern 24 of a low space frequency. A second board having 300 channel grooves 3a having the projections 6a and 6b on both sides of each groove wall 4a at a pitch of 42 $\mu$m was formed.

The printing operation was actually executed by a liquid jet recording head in which the second board worked as mentioned above had been joined to the first board and assembled in a manner similar to the foregoing embodiment. Thus, a good print could be obtained.

On the contrary, in case of a second board obtained by forming the projections 6a and 6b by first working the channel grooves 3a through the second mask pattern 24 of a low space frequency and, after that, working the concave portions 8 through the first mask pattern 20 of a high space frequency, the shapes of the projections 6a and 6b are unstable. The second board is joined to the first board in a manner similar to the foregoing embodiment. The printing operation was actually executed. Thus, a good print could not be obtained.

In FIGS. 2A and 2B and FIGS. 5A and 5B showing both of the foregoing embodiments, the projection optical system of 1/1 has been used as a projection optical system in the laser working machine. However, a similar effect can be also obtained even by using a projection optical system of ¼ or ⅕.

As mentioned above, when a fine and complicated shape is laser worked, in case of working by using a plurality of mask patterns, by sequentially laser working from the mask pattern of a high space frequency to the mask pattern of a low space frequency, the formation of the secondary product due to the laser working can be reduced. Even when the secondary product due to the laser working exists, the influence by the secondary product is reduced and the laser working can be performed. Therefore, a fine and complicated shape can be stably and accurately worked. A fine and complicated shape and a pattern of a fine space frequency can be easily, cheaply, and accurately worked.

Further, in the manufacturing process of the liquid jet recording head, a complicated and fine shape which could not be formed by the conventional injection molding can be cheaply and accurately worked. Thus, complicated and fine projections can be easily and accurately worked on the joint surface of the second board together with the working of the channel grooves. The first and second boards can be joined with a good adhesion property. A finer liquid jet recording head can be easily and cheaply manufactured.

The invention provides an excellent effect in a recording head and a recording apparatus of, particularly, what is called an ink jet recording system such that a flying droplet is formed by using a heat energy and the recording is performed among the liquid jet recording systems.

The typical arrangement and principle have been disclosed in, for example, the specifications of U.S. Pat. Nos. 4,723,129 and 4,740,796. It is preferable to embody the invention by using those fundamental principles. This recording system can be applied to any one of what is called an on-demand type and a continuous type.

The recording system will now be briefly explained. A discharge signal is supplied from a driving circuit to each electrothermal converting member serving as a discharge energy generating element arranged in correspondence to a sheet or liquid flow path on which a recording liquid (ink) is held, namely, at least one driving signal for giving a rapid temperature rise such as to cause a film boiling phenomenon beyond a nucleate boiling phenomenon is supplied to the recording liquid (ink) in correspondence to recording information, thereby generating a heat energy and causing a film boiling on a heat active surface of the recording head. Since a bubble corresponding to the driving signal which is supplied to the electrothermal converting member in a one-to-one corresponding relation can be formed from the recording liquid (ink) as mentioned above, the invention is effective for, particularly, a recording method of the on-demand type. The recording liquid (ink) is discharged through the discharge port by the growth and contraction of the bubble, thereby forming at least one droplet. The driving signal is more preferably in a pulse shape since the growth and contraction of the bubble are quickly and properly performed, and therefore, the discharge of the recording liquid (ink) can be accomplished with an excellent response characteristic. As a driving signal in a pulse shape, signals as disclosed in the specifications of U.S. Pat. Nos. 4,463,359 and 4,345,262 are suitable. The further excellent recording can be performed by using the conditions disclosed in the specification of U.S. Pat. No. 4,313,124 of the invention regarding a temperature rising ratio of the heat active surface.

As an arrangement of the recording head, in addition to the arrangement (rectilinear liquid flow path or right-angled liquid flow path) in which a discharge port, a liquid flow path, and an electrothermal converting member are combined as disclosed in each of the above specifications, the invention is also effective to the head having the arrangement in which the heat active portion is arranged in a bending region as disclosed in the specifications of U.S. Pat. Nos. 4,558,333 and 4,459,600.

In addition, the invention is also effective to the head having the arrangement based on JP-A-59-123670 which discloses the arrangement such that a slit which is common to a plurality of electrothermal converting members is used as a discharge port of an electrothermal converting member or JP-A-59-138461 which discloses the arrangement such that an opening which absorbs a pressure wave of a heat energy is made correspond to a discharge port.

Further, as a recording head in which the invention is effectively used, there is a recording head of a full line type of a length corresponding to the maximum width of a medium to be recorded which can be recorded by a recording apparatus. As a full line head, a head with a full line arrangement obtained by combining a plurality of recording heads as disclosed in the above specifications or one full line recording head which is integratedly formed can be also used.

Further, the invention is also effective in case of using a recording head of an exchangeable chip type such that by attaching the head to the apparatus main body, it can be electrically connected to the apparatus main body or the ink can be supplied from the apparatus main body or a recording head of a cartridge type which is provided integratedly with the recording head itself.

The arrangement such that recovery means or spare auxiliary means is added to the recording head is preferable because the recording apparatus can be further stabilized. When specific examples of them are now mentioned, in order to perform the stable recording, it is also effective to add capping means, cleaning means, pressurizing or sucking means, an electrothermal converting member or another heating element different therefrom, pre-heating means by a combination thereof, or pre-discharge mode means for performing another discharge different from the recording to the recording head.

Further, a recording mode of the recording apparatus is not limited to a mode for recording only a main color such as black or the like but may be a mode in which the recording head is integratedly arranged or a mode in which the recording apparatus is arranged by a combination of a plurality of recording heads. The invention is also extremely effective to an apparatus having at least one of a multi-color of different colors and a full color by mixed colors.

Although the ink has been described as liquid in the above embodiment, it is also possible to use ink which is solidified at the room temperature or less and is softened or becomes a liquid at the room temperature or ink which is softened or becomes a liquid in a temperature range from 30° C. or higher to 70° C. or lower as a temperature range of the temperature adjustment which is generally performed in the ink jet. That is, any ink can be used so long as it is liquefied when a recording signal is supplied during using. In addition, a temperature increase by the heat energy is positively prevented by using the energy as an energy for a state change from a solid state to a liquid state of the ink. Or, ink which is solidified in a leaving state is used for the purpose of prevention of evaporation of the ink. In any case, it is also possible to use ink having a nature such that it is liquefied only by a heat energy, such as ink which is liquefied by applying a heat energy in accordance with a recording signal and is discharged as an ink liquid, ink which has already started solidifying itself when the ink reaches a recording medium, or the like. In such a case, as disclosed in JP-A-54-56847 or JP-A-60-71260, it is also possible to use an arrangement such that in a state where ink is held as a liquid or solid matter in a concave portion or a through hole of a porous sheet, the ink faces the electrothermal converting member. The execution of the foregoing film boiling system is the most effective method for each ink mentioned above.

Further, as a form of an ink jet recording apparatus, in addition to a form such that the recording apparatus is used as an image output terminal of an information processing apparatus such as a computer or the like, it is also possible to use a form of a copying apparatus in which the recording apparatus is combined to a reader or the like and, further, a form of a facsimile apparatus having a transmitting and receiving function.

Since the invention has been arranged as mentioned above, when a complicated and fine shape is laser worked by using a plurality of mask patterns, by sequentially laser working from the mask pattern of a high space frequency to the mask pattern of a low space frequency, the influence by the secondary product due to the laser working is reduced and the formation of the laser secondary product can be suppressed. Therefore, a stable shape can be easily and cheaply laser worked.

In the working process of the liquid jet recording head, a complicated and fine shape which could not be formed by the conventional injection molding can be cheaply and accurately worked. Therefore, complicated and fine projections can be easily and accurately worked on the joint surface of the second board together with the working of the channel grooves. The first and second boards can be joined with a good adhesion property. A more acurate finer liquid jet recording head can be easily and cheaply formed. The improvement of yield at the time of working of the liquid jet recording head and the reduction in working costs can be accomplished.

What is claimed is:

1. A manufacturing method of a liquid jet recording head comprising: a first board in which a plurality of discharge energy generating elements for discharge ink are formed; and a second board in which a plurality of discharge ports for discharge the ink and a plurality of channel grooves each communicating with each of said discharge ports are worked and formed, a common liquid chamber for temporarily holding the ink which is supplied to said channel grooves and said discharge ports is provided, and projections which are deformed when said first and second boards are joined are further formed on a joint surface with said first board, whereby the liquid jet recording head is manufactured by joining said first and second boards in a form such that said discharge energy generating elements and said channel grooves correspond to each other, said projections being provided at a discharge port side of said channel grooves and between said channel grooves, wherein when said channel grooves and said projections of said second board are laser worked by irradiating a laser beam through a laser mask having working patterns corresponding to those shapes, the workpiece is sequentially worked so that said channel grooves are formed after said projections are formed.

2. A method according to claim 1, wherein said mask pattern of the high space frequency is a pattern to work said projections which are deformed at the time of joining and said mask pattern of the low space frequency is a pattern to work said channel grooves.

3. A method according to claim 2, wherein said laser beam which is used for said laser working is a pulse ultraviolet laser beam.

4. A method according to claim 1, wherein said laser beam which is used for said laser working is a pulse ultraviolet laser beam.

* * * * *

UNITED STATES PATENT AND TRADEMARK OFFICE
CERTIFICATE OF CORRECTION

PATENT NO. : 6,071,677
DATED : June 6, 2000
INVENTOR(S) : Shin Ishimatsu et al

Page 1 of 1

It is certified that error appears in the above-identified patent and that said Letters Patent is hereby corrected as shown below:

<u>Title page,</u>
Item [56] References Cited: "Ayata e al" should read -- Ayata et al --;

<u>Column 2,</u>
Line 8, "JPA-4-" should read -- JP-A-4 --;

<u>Column 4,</u>
Line 41, "2A and 2H, " should read -- 2A and 2B, --;

<u>Column 5,</u>
Line 15, "resinolded" should read -- resin-molded --;

<u>Column 8,</u>
Line 32, "be also" should read -- also be --;

<u>Column 9,</u>
Line 55, "be also" should read -- also be --.

Signed and Sealed this

Eighteenth Day of September, 2001

*Attest:*

NICHOLAS P. GODICI
*Attesting Officer*     *Acting Director of the United States Patent and Trademark Office*